US012671650B2

(12) United States Patent
Lin et al.

(10) Patent No.: US 12,671,650 B2
(45) Date of Patent: Jun. 30, 2026

(54) 3GPP R18 MULTI-PATH

(71) Applicant: MEDIATEK INC., Hsinchu (TW)

(72) Inventors: Guan-Yu Lin, Hsinchu (TW); Xuelong Wang, Beijing (CN); Nathan Edward Tenny, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/450,533

(22) Filed: Aug. 16, 2023

(65) Prior Publication Data

US 2024/0064093 A1 Feb. 22, 2024

(30) Foreign Application Priority Data

Aug. 18, 2022 (WO) ................ PCT/CN2022/113322
Aug. 18, 2022 (WO) ................ PCT/CN2022/113385
Aug. 10, 2023 (CN) .......................... 202311006317.1

(51) Int. Cl.
*H04L 45/24* (2022.01)
*H04L 45/16* (2022.01)
*H04W 76/15* (2018.01)

(52) U.S. Cl.
CPC .............. *H04L 45/24* (2013.01); *H04L 45/16* (2013.01); *H04W 76/15* (2018.02)

(58) Field of Classification Search
None
See application file for complete search history.

(56) References Cited

U.S. PATENT DOCUMENTS

2018/0110082 A1* 4/2018 Saily ..................... H04W 76/25
2025/0039083 A1* 1/2025 Li ...................... H04L 41/0803

OTHER PUBLICATIONS

Extended European Search Report Issued Dec. 20, 2023 in European Application 23191652.9, 9 pages.
Huawei et al., "Discussion on Rel-18 multi-path via SL relay and UE aggregation", 3GPP TSG-RAN WG2 Meeting #119e Electronic Online, Aug. 17-29, 2022, XP052261795, 10 pages.
Intel Corporation, "Discussion on Multi-path Relaying", 3GPP TSG RAN WG2 Meeting #119-e Electronic meeting, Aug. 17-26, 2022, XP052260603, 9 pages.
ZTE Corporation et al., "Discussion on SL relay service continuity", 3GPP TSG-RAN WG2 Meeting #115 Electronic Online, Aug. 9-27, 2021, XP052034650, 9 pages.

* cited by examiner

*Primary Examiner* — Anh Ngoc M Nguyen

(74) *Attorney, Agent, or Firm* — Winston Hsu

(57) ABSTRACT

Aspects of the disclosure provide a method for a first user equipment (UE) that has a first path to a network to add a second path to the network. For example, the method can include receiving, at the first UE, a first radio resource control (RRC) message from the network for addition of the second path. The method can also include configuring, by the first UE, the second path based on the first RRC message.

16 Claims, 10 Drawing Sheets

700

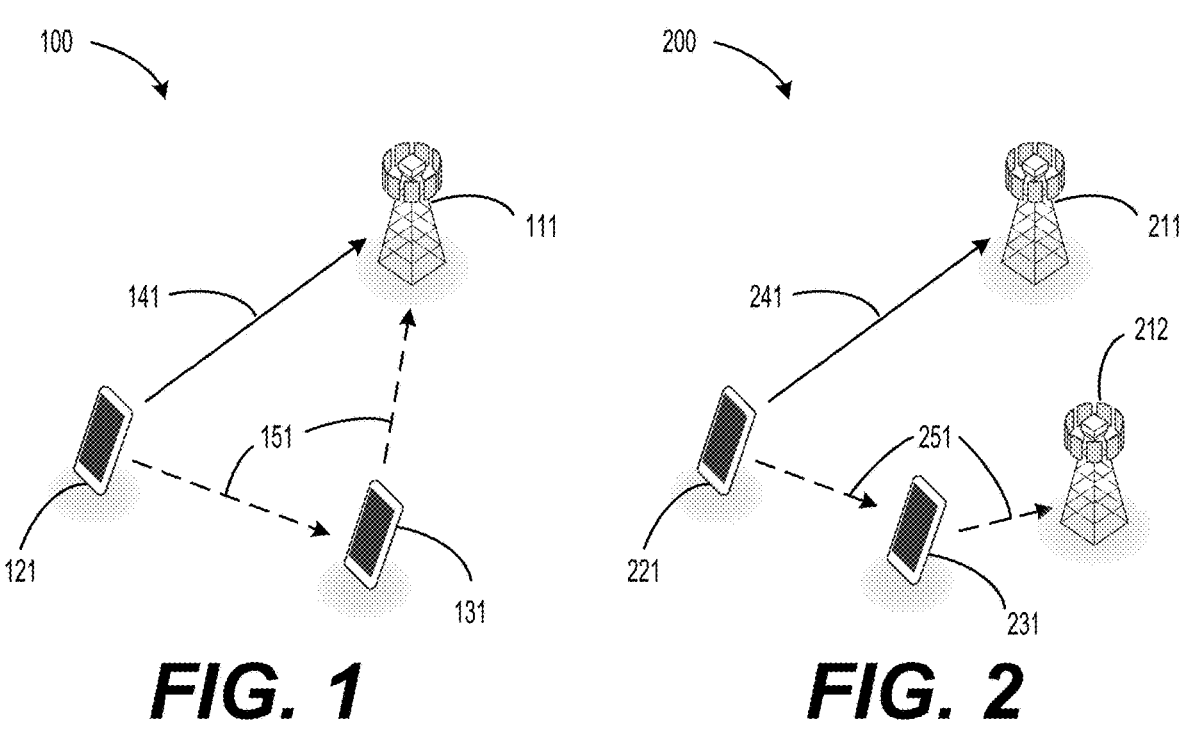
FIG. 1
FIG. 2
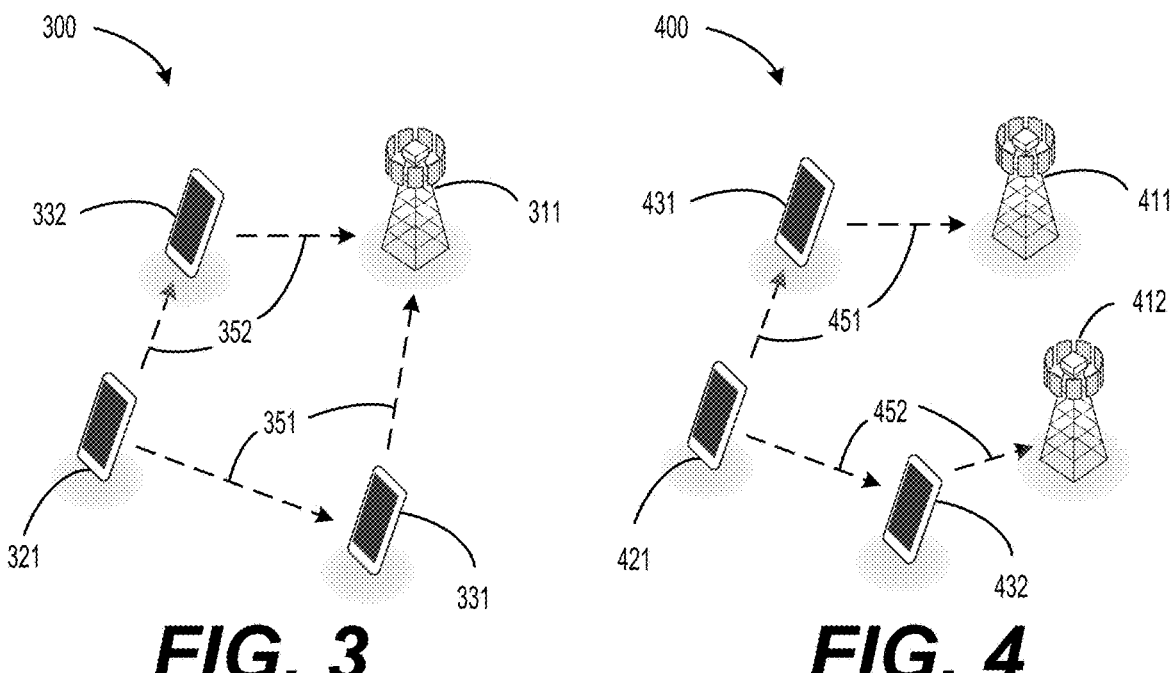
FIG. 3
FIG. 4

500 remote UE          relay UE          gNB step 0. measurement step 510: measurement report for direct Uu step 520: NW-triggered direct link setup step 530: RACH procedure step 540: RRC reconfiguration step 550: RRC reconfiguration complete

600

600A

610A

620A

700

3GPP R18 MULTI-PATH

CROSS-REFERENCE TO RELATED APPLICATIONS

This application claims the priorities of PCT Application No. PCT/CN2022/113322 entitled "AN EXTENSIVE SYSTEM ARCHITECTURE TO SUPPORT MULTI-PATH CONFIGURATION" filed on Aug. 18, 2022, PCT Application No. PCT/CN2022/113385 entitled "METHOD OF PATH ADDITION AND REMOVAL TO SUPPORT MULTI-PATH CONFIGURATION" filed on Aug. 18, 2022, and CN Application No. 202311006317.1 filed on Aug. 10, 2023, which are incorporated herein by reference in their entirety.

TECHNICAL FIELD

The present disclosure relates to wireless communications, and, more particularly, to methods and apparatuses for adding and removing a second path to support multi-path configuration.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

L2 Relay and L3 Relay

To extend network coverage, diverse relay technologies are developed. A relay node can be used to forward packets/signals between a network node (e.g., a base station (BS), a transmission and reception point (TRP)) and a user equipment (UE).

The relay node can be network vendor deployed infrastructure, such as long-term evolution (LTE) relay node and new radio (NR) integrated access and backhaul (IAB) node specified since 3GPP R16. These kind of relay nodes are controlled by a network and probably can be transparent to the UE.

The relay node can also be a user deployed relay, e.g., using a UE as relay (called a UE relay). Compared to IAB, this kind of relay node has a much more limited transmission/reception capability in forwarding traffic. However, its advantage is to support low-cost and dynamic/flexible deployment. Using a UE relay to extend network coverage is known as UE-to-Network relay (or UE-to-NW relay or U2N relay).

In 3GPP context, a relay UE uses sidelink (SL, different from uplink (UL) and downlink (DL)) resources to communicate with a remote UE (or a source UE, which is the source of traffic to be forwarded). Therefore, in 3GPP UE-to-NW relay is also known as SL relay.

To support sidelink relay, there are two kinds of UE-to-NW relay architecture, i.e., Layer 2 relay (L2 relay) and Layer 3 relay (L3 relay).

An L3-based sidelink relay UE forwards a data packet flow of a remote UE as IP traffic as a general router in a data communication network. The IP traffic-based forwarding is conducted in a best effort way. For L3 UE-to-NW relay, there exist both sidelink radio bearers (SLRBs) over a PC5 interface and Uu radio bearers to carry the quality of service (QoS) flows established between a remote UE and a core network such as a fifth generation core (5GC). L3 UE-to-NW relay can support flow-based mapping at service data adaption protocol (SDAP) sublayer when converting PC5 flow to Uu flow, and vice versa, during traffic forwarding. Note that since L3-based sidelink relay UE works like an IP router, the remote UE is transparent to the base station, i.e., the base station cannot know whether the traffic transmitted by a relay UE originates from this relay UE itself, or originates from a remote UE but is forwarded by this relay UE.

In contrast, in case of L2-based SL relay, relaying is performed above a radio link control (RLC) sublayer via a relay UE for both control plane (CP) and user plane (UP) between a remote UE and a network. Uu SDAP/packet data convergence protocol (PDCP) and radio resource control (RRC) are terminated between a remote UE and a gNB, while RLC, medium access control (MAC) and physical layer (PHY) are terminated in each link (i.e., the link between a remote UE and a UE-to-NW relay UE and the link between a UE-to-NW relay UE and a gNB).

An adaptation layer over RLC layer is supported in Uu to perform bearer mapping, and can be also placed over a device-to-device interface such as a PC5 interface to perform bearer mapping at sidelink. The adaptation layer between a relay UE and a gNB is able to differentiate between bearers (e.g., signaling radio bearers (SRBs) and data radio bearers (DRBs)) of a particular remote UE. Within a Uu DRB, different remote UEs and different bearers of the remote UEs can be indicated by additional information included in the adaptation layer header. Unlike in L3 relay, in L2 relay the base station is aware of each remote UE, and thus before the relay UE starts to forward normal data traffic, the end-to-end connection between a remote UE and the base station should be established first. After establishing the RRC connection via SL relay, the remote UE can then forward data traffic based on the established bearers and the forwarding/router information carried in the adaptation layer.

Relay Selection

In 3GPP R17, sidelink relay is supported to enable network coverage extension. To extend network coverage, there are reference signal received power (RSRP) criteria to determine whether a UE can serve as a relay UE or a remote UE.

To be specific, in 3GPP R17 spec for SL relay, it is specified that a remote UE should have a measured Uu reference signal received power (RSRP) below an RSRP threshold (threshHighRemote). This means that a UE can request for help traffic forwarding only when the UE has a very bad Uu RSRP. Besides, a UE can serve as a relay UE only when its Uu RSRP is above an RSRP threshold (threshLowRelay). This means that a UE can help other UEs to forward traffic only when the UE has good Uu link quality. In addition, a UE can be a relay UE only when its Uu RSRP is below another RSRP threshold (known as threshHighRelay), which is used to prevent a cell-center UE from being a relay. Otherwise, if a relay UE is in very cell center and a remote UE is in cell edge, the remote UE would transmit with a very large power to communicate with the cell center UE and thus cause much interference to its neighboring UE. Finally, there is a sidelink RSRP threshold (sl-RSRP-Thresh) used to measure the sidelink quality between the remote UE and the relay UE. If the SL RSRP between the remote UE and the relay UE is below the threshold, the sidelink towards the relay UE is considered too bad to support satisfactory relay performance.

When a UE satisfies the remote UE criteria (Uu RSRP below threshHighRemote), it is up to UE implementation to perform cell reselection or relay selection.

Single Path Relay and Multi-Path Relay

Note that in 3GPP R17, only single path UE-to-NW relay is supported. That is, a UE can select either a direct path (i.e., directly connecting to a gNB via Uu link) or an indirect path (i.e., connecting to the gNB via traffic forwarding of a relay UE), but not both. Besides, 3GPP R17 only supports single-hop UE-to-NW relay. Support of multi-hop UE-to-NW relay is left to future releases.

To further extend the UE-to-NW relay, multi-hop and multi-path aspects are considered. Multi-hop relay, obviously, can help to eliminate deep coverage hole. In contrast, multi-path relay allows multiple traffic forwarding paths from the source to destination, which definitely increases the transmission reliability and may be also beneficial to the throughput of a remote UE.

SUMMARY

Aspects of the disclosure provide a method for a first user equipment (UE) that has a first path to a network to add a second path to the network. For example, the method can include: receiving, at the first UE, a first radio resource control (RRC) message from the network for addition of the second path; and configuring, by the first UE, the second path based on the first RRC message.

In an embodiment, the first path can be an indirect path of the first UE via a second UE to the network, the second path can be a direct path of the first UE to the network, and the first UE and the second UE can have serving cells belonging to the network. In an embodiment, the method can further include sending, by the first UE, a measurement report to the network when a measurement event happens. For example, the measurement event can happen when the serving cell of the second UE is better than a first threshold and the serving cell of the first UE becomes better than a second threshold. In an embodiment, configuring, by the first UE, the second path based on the first RRC message can include: performing a cell (re-)selection procedure to evaluate a candidate serving cell for the addition of the direct path; and setting the candidate serving cell as a primary cell (PCell) of the first UE. In another embodiment, configuring, by the first UE, the second path based on the first RRC message can include performing a secondary cell (SCell) addition procedure to add the serving cell of the first UE as the direct path for the first UE.

In an embodiment, the first path can be a direct path of the first UE to the network, the second path can be an indirect path of the first UE via a second UE to the network, and the first UE and the second UE can have serving cells belonging to the network. In an embodiment, the method can further include sending, by the first UE, a measurement report to the network when a measurement event happens. For example, the measurement event can happen when the serving cell of the first UE is better than a first threshold and the serving cell of the second UE becomes better than a second threshold. In an embodiment, configuring, by the first UE, the second path based on the first RRC message can include: performing a relay selection procedure to evaluate a candidate relay UE for the addition of the indirect path; and setting the candidate relay UE as the second UE in the indirect path of the first UE. In another embodiment, configuring, by the first UE, the second path based on the first RRC message can include performing a cell addition procedure to add the serving cell of the second UE as the indirect path for the first UE.

In an embodiment, performing the cell addition procedure can include sending, by the first UE, a report to the network when a list of candidate relay UEs is updated that meet a criterion for the addition of the indirect path. For example, the report can be sent via a UEAssistanceInformation message or a SidelinkUEInformation message. In an embodiment, the method can further include receiving a second RRC message to configure the indirect path.

Aspects of the present disclosure also provide a method for a first UE that has a first path to a network and a second path to the network. For example, the method can include receiving, at the first UE, a radio resource control (RRC) message from the network for removal of the second path; and removing, by the first UE, the second path based on the RRC message.

In an embodiment, the first path can be an indirect path of the first UE via a second UE to the network, the second path can be a direct path of the first UE to the network, and the first UE and the second UE can have serving cells belonging to the network. In an embodiment, the method can further include sending, by the first UE, a measurement report to the network when a measurement event happens. For example, the measurement event can happen when the serving cell of the second UE is better than a first threshold and the serving cell of the first UE becomes worse than a second threshold.

In an embodiment, the first path can be a direct path of the first UE to the network, the second path can be an indirect path of the first UE via a second UE to the network, and the first UE and the second UE can have serving cells belonging to the network. In an embodiment, the method can further include sending, by the first UE, a measurement report to the network when a measurement event happens. For example, the measurement event can happen when the serving cell of the second UE is better than a first threshold and the serving cell of the first UE becomes worse than a second threshold.

Methods are provided to support system architecture when multi-path is configured for a remote UE.

In one novel aspect, it is proposed how to model the two paths of a remote UE, when the remote UE and the selected relay UE are configured with (1) same gNB and same serving cell, (2) same gNB but different serving cells, and (3) different gNBs.

In one novel aspect, it is proposed how a remote UE determines its PCell when multi-path is configured.

In one novel aspect, it is proposed how a remote UE monitors paging messages, when multi-path is configured and a relay UE can help forward paging messages.

In a novel aspect, it is proposed how a remote UE receives system information, when multi-path is configured and a relay UE can help forward system information.

Aspects of the present disclosure also provide an apparatus that has a direct path to a network. For example, the apparatus can include circuitry configured to perform a method for the apparatus to add a second path to the network and remove the second path from the network. In an embodiment, the method can include receiving a first RRC message from the network for addition of the second path and configuring the second path based on the first RRC message. In an embodiment, the method can further include receiving a second RRC message from the network for removal of the second path and removing the second path based on the second RRC message.

Methods are provided to establish the second path towards the network for a UE supporting multi-path configuration.

In an aspect, the remote UE performs measurement for candidate serving cells and/or candidate relay UE, when a first path is already established and works normally and the remote UE is multi-path enabled.

In an aspect, a remote UE performs measurement reporting when one or more measurement events specific to multi-path occur.

In an aspect, a new event to trigger measurement report for multi-path is when the PCell becomes better than threshold1 and a candidate L2 U2N Relay UE becomes better than threshold2.

In an embodiment, a new event to trigger measurement report for multi-path is when a serving L2 U2N Relay UE becomes better than threshold1, and an NR cell becomes better than threshold2.

In an embodiment, a new event to trigger measurement report for multi-path, is when a serving L2 U2N Relay UE becomes better than threshold1, and a candidate L2 U2N Relay UE becomes better than threshold2.

In an aspect, based on a measurement report, the gNB transmits an RRC message via an existing path to reconfigure the second path (for path addition) or to release the configuration (for path removal).

BRIEF DESCRIPTION OF THE DRAWINGS

Various embodiments of this disclosure that are proposed as examples will be described in detail with reference to the following figures, wherein like numerals reference like elements, and wherein:

FIG. 1 illustrates a network topology of a remote UE configured with multiple paths, e.g., one direct path and one indirect path, in which the remote UE and a relay UE select serving cells belonging to the same gNB, according to some embodiments of the present disclosure;

FIG. 2 illustrates a network topology of a remote UE configured with multiple paths, e.g., one direct path and one indirect path, in which the remote UE and a relay UE select serving cells belonging to different gNBs, according to some embodiments of the present disclosure;

FIG. 3 illustrates a network topology of a remote UE configured with multiple paths, e.g., two indirect paths, in which two relay UEs select serving cells belonging to the same gNB, according to some embodiments of the present disclosure;

FIG. 4 illustrates a network topology of a remote UE configured with multiple paths, e.g., two indirect paths, in which two relay UEs select serving cells belonging to different gNBs, according to some embodiments of the present disclosure;

DETAILED DESCRIPTION OF EMBODIMENTS

Figure 5:
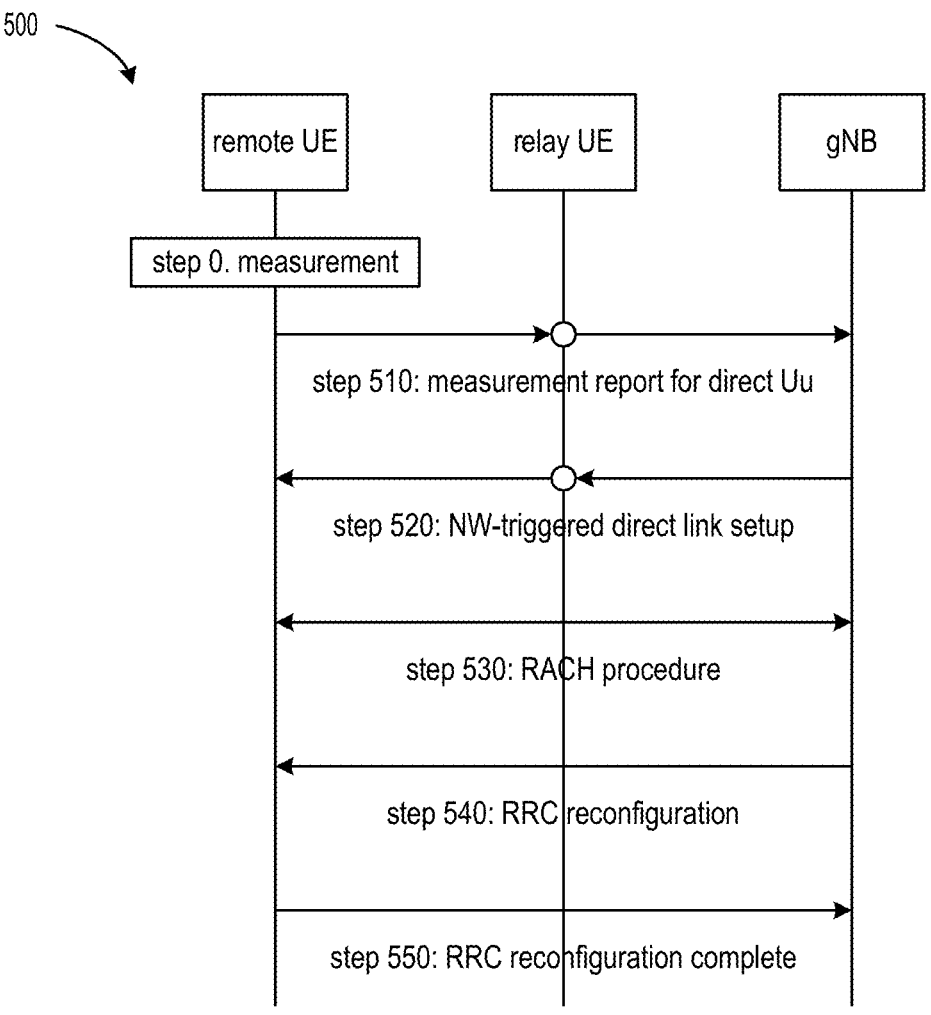
FIG. 5 shows an exemplary signaling procedure for a remote UE that already has an indirect path established to add a second path, e.g., a direct path, according to some embodiments of the present disclosure.

In the following description, dual-path is used as examples to explain the embodiments of the present disclosure. It is noted that the present disclosure is not limited to the dual-path scenario, but can be generalized to multi-path scenarios, in which the number of paths between a remote UE and a gNB can be equal to or more than two.

Models for multi-path configurations (primary cell (PCell) configuration, carrier aggregation (CA)/dual connectivity (DC) model, paging monitoring and system information acquisition)

The system architecture to support multi-path depends on the relay topology. Considering a remote UE configured with two paths and single-hop relay, four possible network topologies 100 to 400 are illustrated in FIGS. 1 to 4, respectively.

FIG. 1 illustrates a network topology 100 of a remote UE configured with multiple paths according to some embodiments of the present disclosure. In the network topology 100, a remote UE 121 and a relay UE 131 can select serving cells that belong to the same gNB, e.g., a gNB 111. As shown in FIG. 1, the remote UE 121 communicates with a first serving cell of the gNB 111 via a direct path 141 and communicates with a second serving cell of the gNB 111 via an indirect path 151 through the relay UE 131. In an embodiment, the first serving cell is the second serving cell. In another embodiment, the first serving cell is different from the second serving cell.

FIG. 2 illustrates a network topology 200 of a remote UE configured with multiple paths according to some embodiments of the present disclosure. In the network topology 200, a remote UE 221 and a relay UE 231 can select serving cells that belong to different gNBs, e.g., a first gNB 211 and a second gNB 212, respectively. As shown in FIG. 2, the remote UE 221 communicates with a first serving cell of the first gNB 211 via a direct path 241 and communicates with a second serving cell of the second gNB 212 via an indirect path 251 through the relay UE 231.

FIG. 3 illustrates a network topology 300 of a remote UE configured with multiple paths according to some embodiments of the present disclosure. In the network topology 300, a remote UE 321 and two relay UEs, e.g., a first relay UE 331 and a second relay UE 332, can select serving cells that belong to the same gNBs, e.g., a gNB 311. As shown in FIG. 3, the remote UE 321 communicates with a first serving cell of the gNB 311 via a first indirect path 351 through the first relay UE 331 and communicates with a second serving cell of the gNB 311 via a second indirect path 352 through the second relay UE 332. In an embodiment, the first serving cell is the second serving cell. In another embodiment, the first serving cell is different from the second serving cell.

FIG. 4 illustrates a network topology 400 of a remote UE configured with multiple paths according to some embodiments of the present disclosure. In the network topology 400, a remote UE 421 and two relay UEs, e.g., a first relay UE 431 and a second relay UE 432, can select serving cells that belong to different gNBs, e.g., a first gNB 411 and a second gNB 412, respectively. As shown in FIG. 4, the remote UE 421 communicates with a first serving cell of the first gNB 411 via a first indirect path 451 through the first relay UE 431 and communicates with a second serving cell of the second gNB 412 via a second indirect path 452 through the second relay UE 432.

In the present disclosure, the description is mainly for the network topologies 100 and 200, but the design idea can be readily extended to the network topologies 300 and 400.

PCell Configuration

In multi-path configurations, a remote UE and a relay UE may select different cells for their Uu links (e.g., a first cell and a second cell, respectively). A question is whether the remote UE should consider the first cell or the second cell as its PCell.

In an embodiment, the remote UE can always consider its PCell in its direct Uu link. The advantage is that using the direct link for control signaling transmission may reduce signaling latency and have better reliability. In this case, if a UE originally has a relay path and adds the direct path later, the network would need to reconfigure the PCell, if the relay UE and the remote UE are linked to different serving cells.

In an embodiment, whether the PCell is on the remote UE's Uu link or the relay UE's Uu link can be up to network configuration. This embodiment allows the remote UE's Uu link as a secondary cell (SCell), and thus existing SCell activation approach (e.g., dormant BWP) can be reused to save the power of the remote UE.

In an embodiment, the remote UE can treat a path that is established first as the PCell. If the remote UE starts with the indirect path, the gNB can add the direct path as an SCell, and vice versa. This embodiment may be the simplest alternative in terms of specification impact, and give the flexibility of network determination without the need to add special signaling and procedures for switching which path is the PCell.

CA/DC Model

For multi-path configurations, a question is how these multiple paths, e.g., two paths, interact with each other or the corresponding protocol stacks.

In an embodiment, if a remote UE and a relay UE are connected to the same gNB, this configuration can be considered a multi-component carrier (CC) model. In the multi-CC model, when considering the remote UE configured with a direct link and an indirect link, the remote UE can maintain (at least) a UL carrier (in its Uu link) and a sidelink (SL) carrier (for communicating with the relay UE). The two paths, from the remote UE's perspective, belong to the same RRC connection, because the two paths terminate at the same gNB, and for both paths the remote UE uses the same (unique) C-RNTI.

In an embodiment, if the remote UE and the relay UE are connected to the same gNB and this configuration is modeled as a multi-CC model, media access control (MAC) control element (CE) like signaling controls the (de)activation of each path. For example, the definition of CC in SCell (de)activation MAC CE can be generalized as per path, and the gNB can use the modified MAC CE to make an indirect path enter activated/deactivated/dormant state. As another example, a new MAC CE format can be defined to control the activated/deactivated/dormant state of each indirect path, separated from legacy SCell.

In an embodiment, if the remote UE and the relay UE are connected to the same gNB, this configuration can be considered as a multi-connection model. In the so-called multi-connection model, the remote UE can maintain separate RRC connections for the two paths. The gNB may assign different C-RNTIs for the remote UE to manage the two paths separately.

In an embodiment, if the remote and the relay UE are connected to different gNBs, the remote UE can apply a DC model to handle the two paths. That is, similar to legacy DC, the remote UE can consider the two paths with separate RRC/RLC/MAC layers. Received traffic from the two paths (for downlink) may be merged in PDCP layer, and transmitted traffic may be split in PDCP layer. There may be a split bearer configured so that the remote UE can transmit/receive traffic to/from different gNBs.

Paging Monitoring

One discussion point to support multi-path is about paging monitoring. In R17 single-hop single-path relay, an RRC IDLE/INACTIVE remote UE needs not monitor paging by itself. The relay UE may either monitor paging occasions for the remote UE or receive and forward the paging notification when receiving dedicated RRC message from the gNB.

When multi-path is configured, there are several possible embodiments.

In an embodiment, if a remote UE and a relay UE select the same gNB and the same serving cell, the remote UE can rely on the relay UE to forward the paging notification.

In an embodiment, if the remote UE and the relay UE select the same gNB and the same serving cell, the remote UE can monitor paging messages by itself.

In an embodiment, if the remote UE and the relay UE select the same gNB but different serving cells, the remote UE can still rely on the relay UE to forward the paging notification. That is, as long as the remote UE and the relay UE select the same gNB, the legacy paging procedure for SL relay can be reused. For example, it is assumed that the gNB would transmit paging messages of the remote UE to the relay UE via dedicated RRC signaling.

In an embodiment, if the remote UE and the relay UE select the same gNB but different serving cells, whether the remote UE monitors its own paging occasions can depend on where the PCell is located. If the PCell is configured in the relay direct Uu link, the relay UE can monitor paging for the remote UE. If the PCell is configured in the remote direct Uu link, the remote UE can monitor paging occasion by itself.

In an embodiment, if the remote UE and the relay UE select different gNBs, the remote UE can monitor its paging occasions for the direct link, and the relay UE can help forward the paging message from the gNB of the indirect path.

In an embodiment, if the remote UE and the relay UE select different gNBs, the remote UE need not monitor paging for the direct path. If the gNB in the direct path wants to page the remote UE, the paging message will be redirected to the gNB of the indirect path, and then forwarded to the remote UE via the relay UE.

In an embodiment, if the remote UE and the relay UE select different gNBs, the remote UE needs to monitor paging for the direct path, and the relay UE need not help forward the paging messages. If the gNB in the indirect path wants to page the remote UE, the paging message will be redirected to the gNB of the direct path.

System Information Acquisition

In legacy 3GPP R17 sidelink relay (single-path relay), a relay UE would acquire system information for a remote UE, which is useful when the remote UE is out of Uu coverage. When a remote UE is configured with multiple paths, several embodiments as described below are possible.

In an embodiment, if the remote UE and the relay UE select the same gNB and the same serving cell and this serving cell is the remote UE's PCell, the remote UE can rely on the relay UE to acquire and forward the desired system information. That is, the remote UE does not or is not requested to monitor the broadcasted system information of the PCell.

In an embodiment, if the remote UE and the relay UE select the same gNB and the same serving cell and this serving cell is the remote UE's PCell, the remote UE can monitor system information by itself.

In an embodiment, if the remote UE and the relay UE select the same gNB and the same serving cell and this serving cell is the remote UE's PCell, whether the remote UE acquires system information by itself or by relay forwarding can depend on the type of system information. For example, for those system information messages related to latency critical services or functions, the remote UE can be configured to acquire them and monitor the change via the direct Uu link.

In an embodiment, if the remote UE and the relay UE select the same gNB and the same serving cell and this serving cell is the remote UE's PCell, the remote UE is allowed to simultaneously acquire system information via the direct Uu link and request system information from the relay UE via the indirect path.

In an embodiment, if the remote UE and the relay UE select the same gNB and the same serving cell and this serving cell is the remote UE's PCell, the network may configure the remote UE to acquire system information via different ways (e.g., only via the direct path, only via the indirect path, via either the direct or indirect path, or via both the direct and indirect paths) for different types/categories of system information (or system information blocks (SIB s)).

In an embodiment, if the remote UE and the relay UE select the same gNB but different serving cells, whether the remote UE acquires its system information via the direct Uu link can depend on where the PCell is located. If the PCell is configured in the relay direct Uu link, the relay UE will provide system information of the PCell to the remote UE. If the PCell is configured in the remote direct Uu link, the remote UE can acquire system information via the direct remote Uu link.

In an embodiment, if the remote UE and the relay UE select the same gNB but different serving cells and PCell is configured in the remote UE's direct Uu link, the remote UE can still rely on the relay UE to forward the system information. That is, the remote UE does not monitor its selected serving cell (PCell). Instead, when the remote UE's PCell has system information updated, the PCell uses dedicated signaling, via the direct or indirect path, to provide the remote UE with the updated system information or to notify the remote UE about which system information (of interest) is changed.

In an embodiment, if the remote UE and the relay UE select different gNB, the remote UE can acquire system information from the PCell of the direct link, while the relay UE can help forward the system information from the gNB of the indirect path.

Model for the Second Path

When a remote UE has already a first path (with RRC connection established), there are several approaches to model the second path addition for the remote UE.

When the remote UE has built a direct path, there are several models for the remote UE to add the second path (an indirect path) using a relay.

In an embodiment, if the remote UE and the relay are connected to the same BS (or TRP), the addition of the second path can be considered as SCell addition, regardless of whether the first path of the remote UE is a direct path or an indirect path. That is, the definition of SCell addition can be extended/generalized to cover "adding an indirect path via a relay."

In an embodiment, if the remote UE and the relay are connected to the same BS (or TRP), the addition of the second path can be considered as relay addition, regardless of whether the first path is a direct path or an indirect path. The procedure of "relay addition" here is a bit different from legacy relay selection procedure. Relay selection means that the remote UE adds a relay without an existing RRC connection between the remote UE and a gNB, while relay addition means the remote UE adds a relay given an existing RRC connection.

In an embodiment, if the remote UE and the relay are connected to the same BS (or TRP), the addition of the second path can be considered as relay addition if the first path is an indirect path as well; otherwise, the addition of the second path can be considered as relay selection. In this embodiment, relay selection can be defined as the procedure for a remote UE to select its first relay, and relay addition can be defined as the procedure for a remote UE to select the second or more relay.

In an embodiment, if the remote UE and the relay are connected to the same BS (or TRP), relay selection procedure can be reused whenever adding a relay as a new indirect path. When the remote UE has an indirect path and wants to add a direct path, there are also several ways to model the second path addition.

In an embodiment, when a remote UE wants to add a direct path as the second (or third, etc.) path, the path addition can be modeled as SCell addition. For example, a gNB can configure the remote UE to add NR Cells via RRCReconfiguration, and may use MAC CE to activate or deactivate the configured serving cell.

In an embodiment, when a remote UE wants to add a direct path as the second (or third, etc.) path, the path addition can be considered as SCell addition, if there is already an existing direct link for a serving cell of the same gNB. If there is no direct link for a serving cell of the same gNB, the path addition can be considered as cell selection.

To determine whether to perform the procedure for second path addition, the remote UE may need to perform a measurement report in cases where a candidate cell or candidate relay becomes available. In addition to second path addition, a measurement report may be required for second path removal as well.

The procedure for the second path addition can be generalized as follows:

A remote UE can perform the measurement (for Uu or PC5) according to the measurement configuration (including configured measurement events);

The remote UE can perform the measurement report according to its measurement to a gNB;

The gNB can decide the addition of the secondary path and send the corresponding RRC messages to the remote UE (and candidate relay UE(s)); and The secondary path is established.

Signaling for Second Path Establishment/Removal

FIG. 5 shows an exemplary signaling procedure 500 for a remote UE that already has an indirect path established to add a second path, e.g., a direct path, according to some embodiments of the present disclosure. In an embodiment, the candidate cell for the remote UE in the direct path is the same as the serving cell of a relay UE in the established indirect path, as shown in FIG. 1. In an embodiment, to add the direct path, the cell (re)-selection or Scell addition procedure can be reused. Before the signaling procedure 500 starts, the remote UE 121 can perform measurement for NR cells that include the serving cell of the serving relay UE 131, in step 0. For example, the remote UE 121 (e.g., in RRC CONNECTED mode) can measure the received power of a reference signal. If the measurement fulfills a configuration condition or when a measurement event happens, the remote UE 121 will trigger sending of a reference signal received power (RSRP) measurement report to the network, e.g., the gNB 111. In an embodiment, the measurement event can be configured by the network. The signaling procedure 500 can start in step 510.

In step 510, the remote UE 121 can send the RSRP measurement report to the gNB 111 when the measurement event happens. For example, the measurement event can happen when the remote UE 121 receives RSRP (and/or signal to interference and noise ratio (SINR)) is above a first threshold, and then the remote UE 121 will send the RSRP/SINR measurement report to the gNB 111 via relay forwarding (indicated by a circle) by the relay UE 131. That is, even when the remote UE 121 selects a serving relay, i.e., the relay UE 131, the remote UE 121 can still be configured with the measurement report for NE cell measurement. The signaling procedure 500 can then proceed to step 520.

In step 520, the network can transmit to the remote UE 121 a triggering message (e.g., reusing an existing message such as an RRC reconfiguration message or applying a specific message to trigger the addition of a second path), to trigger the remote UE 121 to establish the second path. The signaling procedure 500 can then proceed to step 530.

In step 530, the remote UE 121, after receiving the triggering message, can perform a random access channel (RACH) procedure to acquire UL sync with the gNB 111 in Uu link and perform UL/DL beam alignment. The signaling procedure 500 can then proceed to step 540.

In step 540, after being informed by the remote UE 121 of the completion of the RACH procedure, the gNB 111 can transmit an RRC reconfiguration message to modify the remote UE's 121 RRC connection, e.g., further configuring the remote UE's 121 Uu link. The signaling procedure 500 can then proceed to step 550.

In step 550, the remote UE 121, after configuring its Uu link, can reply to the gNB 111 with an RRC reconfiguration complete message in response to the RRC reconfiguration message.

In an embodiment, if the triggering message includes the RRC reconfiguration message, the remote UE 121 can transmit the RRC reconfiguration complete message in response to the RRC reconfiguration message, and, thus, steps 540 and 550 can be saved. In another embodiment, steps 510 and 520 can be saved if the remote UE 121 is configured to perform autonomous addition of the second path. That is, considering that the NR cell is with good enough Uu link quality, the remote UE 121 can trigger the RACH procedure to establish the Uu link as long as the criteria of Uu link quality configured by the network is satisfied.

Figure 6:
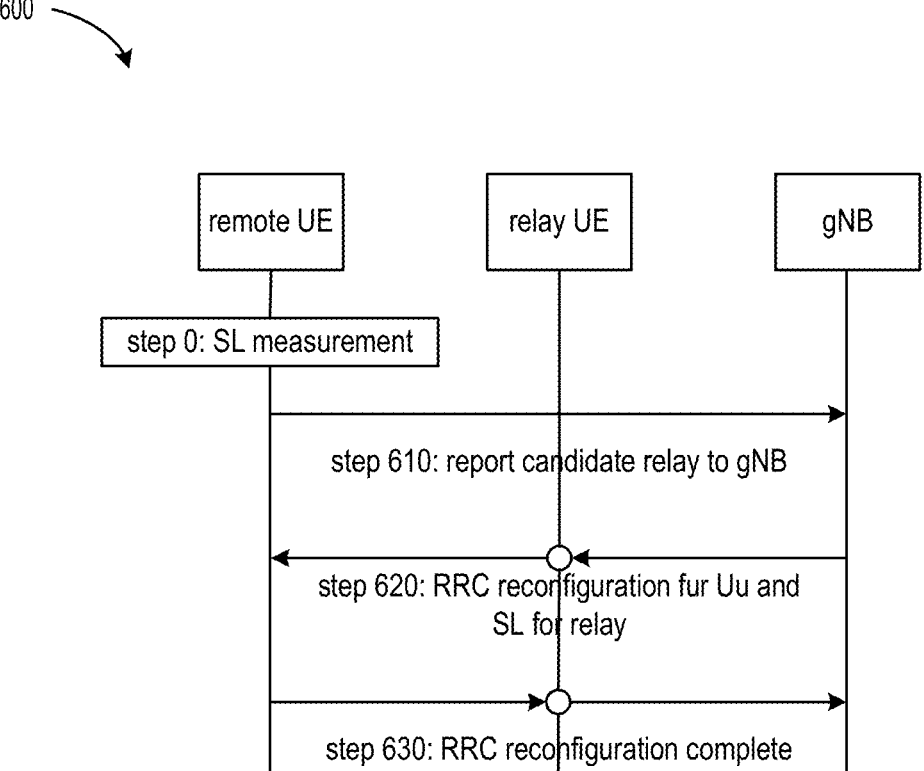
FIG. 6 shows an exemplary signaling procedure for a remote UE that already has a direct path established to add a second path, e.g., an indirect path, according to some embodiments of the present disclosure.

FIG. 6 shows an exemplary signaling procedure 600 for a remote UE that already has a direct path established to add a second path, e.g., an indirect path, according to some embodiments of the present disclosure. In an embodiment, the candidate cell for the remote UE in the indirect path is the same as the serving cell of the remote UE in the established direct path, as shown in FIG. 1. In an embodiment, to add the indirect path (e.g., adding a new relay), a relay selection procedure can be reused or a new relay addition procedure can be performed. For example, when a relay UE to be added has a high enough Uu RSRP above a threshold and a high enough SL RSRP received by the remote UE, the relay selection procedure can be reused to add the relay UE. As another embodiment, when a relay UE to be added has a better Uu RSRP than the Uu RSRP of the remote UE, the new relay addition procedure can be performed to add the relay UE. In an embodiment, the signaling procedure 600 can be initiated by a network, e.g., the gNB 111. Before the signaling procedure 600 starts, the remote UE 121 can be configured to perform measurement for candidate relay UE (e.g., for its SL-RSRP or SD-RSRP) when the remote UE 121 already has a serving cell, in step 0. For example, the remote UE 121 (e.g., in RRC CON-NECTED state) can measure the received power of a reference signal. If the measurement fulfills a configuration condition or when a measurement event happens, the remote UE 121 will trigger sending of a reference signal received power (RSRP) measurement report to the network, e.g., the gNB 111. In an embodiment, the measurement event can be configured by the network. The signaling procedure 600 can start in step 610.

In step 610, the remote UE 121 can send the RSRP measurement to the gNB 111 when the measurement event happens. For example, the measurement event can happen when a candidate relay has SL-RSRP above an SL threshold and, optionally, the serving cell (or PCell) of the remote UE 121 has Uu-RSRP above a Uu threshold, and then the remote UE 121 will send the measurement report to the gNB 111. The identity of the qualified candidate relay UE can be indicated in one of the measurement report messages, a SidelinkUEInformation message, or a UEAssistanceInfor-mation message, for example. The signaling procedure 600 can then proceed to step 620.

In step 620, the gNB 111, after receiving the indication, can transmit an RRC reconfiguration message to the remote UE 121 to configure the Uu and SL RLC channel configu-rations for the indirect path 151. In an embodiment, the RRC reconfiguration message can be transmitted via the direct path 141 or the indirect path 151. The signaling procedure 600 can then proceed to step 630.

In step 630, the remote UE 121, after configuring the Uu and SL links, can reply to the gNB 111 with an RRC reconfiguration complete message in response to the RRC reconfiguration message.

Figure 6A:
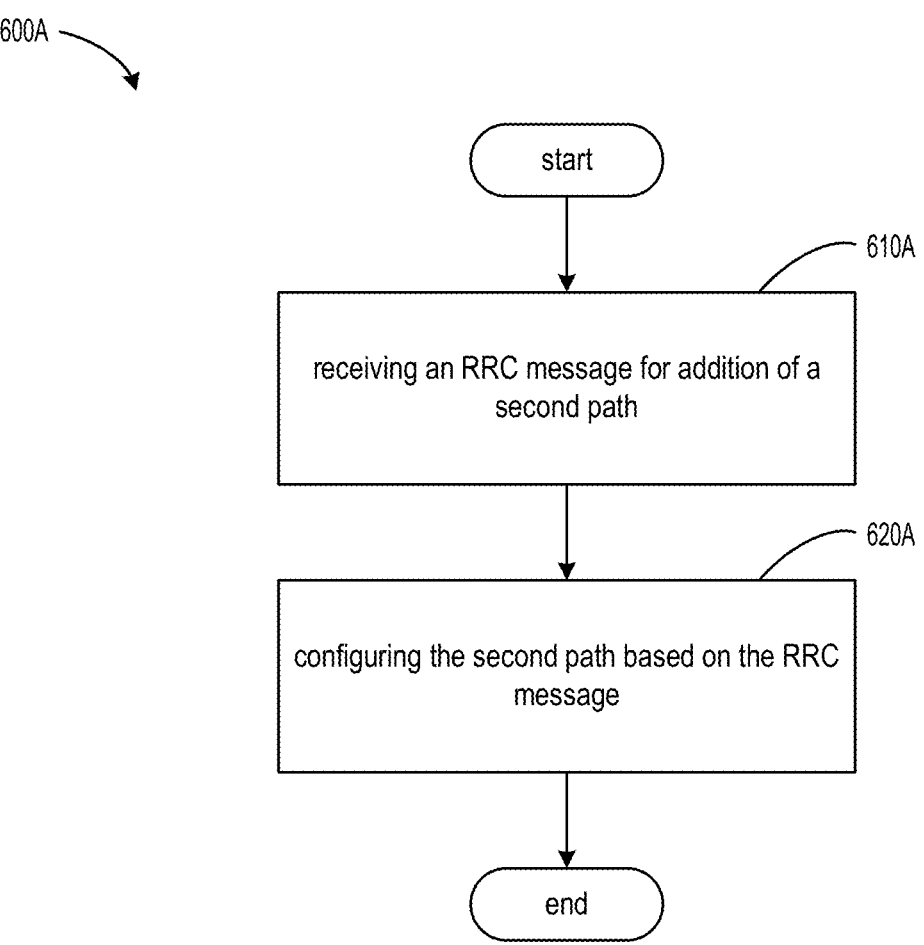
FIG. 6A is a flow chart of an exemplary method for a remote UE that already has a direct path established to add a second path, e.g., an indirect path, according to some embodiments of the present disclosure.

FIG. 6A is a flow chart of an exemplary method 600A for a remote UE that already has a direct path established to add a second path, e.g., an indirect path, according to some embodiments of the present disclosure. The method 600A can correspond to the signaling procedures 500 and 600. In various embodiments, some of the steps of the method 600A shown can be performed concurrently or in a different order than shown, can be substituted by other method steps, or can be omitted. Additional method steps can also be performed as desired. Aspects of the method 600A can be implemented by a wireless device, such as the remote UE 121 illustrated in and described with respect to the preceding figures. In an embodiment, the remote UE 121 has a first path to a network, e.g., the gNB 111, and the method 600A can add a second path for the remote UE 121 to the gNB 111. The method 600A can include steps 610A and 620A.

In step 610A, the remote UE 121 receives a first RRC message from the network for addition of the second path. In step 620A, the remote UE 121 configures the second path based on the first RRC message.

In an embodiment, the first path can be an indirect path of the remote UE 121 via a relay UE, e.g., the relay UE 131, to the network, the second path can be a direct path of the remote UE 121 to the network, and the remote UE 121 and the relay UE 131 can have serving cells belonging to the network. In an embodiment, the remote UE 121 can send a measurement report to the network when a measurement event happens. For example, the measurement event can happen when the serving cell of the relay UE 131 is better than a first threshold and the serving cell of the remote UE 121 becomes better than a second threshold. In an embodiment, the remote UE 121 can configure the second path based on the first RRC message by performing a cell (re-)selection procedure to evaluate a candidate serving cell for the addition of the direct path, and then setting the candidate serving cell as a primary cell (PCell) of the remote UE 121. In another embodiment, the remote UE 121 can configure the second path based on the first RRC message by performing a secondary cell (SCell) addition procedure to add the serving cell of the remote UE as the direct path for the remote UE.

In an embodiment, the first path can be a direct path of the remote UE 121 to the network, the second path can be an indirect path of the remote UE 121 via the relay UE 131 to the network, and the remote UE 121 and the relay UE 131 can have serving cells belonging to the network. In an embodiment, the remote UE 121 can send a measurement report to the network when a measurement event happens. For example, the measurement event can happen when the serving cell of the remote UE 121 is better than a first threshold and the serving cell of the relay UE 131 becomes better than a second threshold. In an embodiment, the remote UE 121 can configure the second path based on the first RRC message by performing a relay selection procedure to evaluate a candidate relay UE for the addition of the indirect path, and then setting the candidate relay UE as the relay UE in the indirect path of the remote UE. In another embodiment, the remote UE 121 can configure the second path based on the first RRC message by performing a cell addition procedure to add the serving cell of the relay UE as the indirect path for the remote UE. For example, the remote UE 121 can send a report to the network when a list of candidate relay UEs is updated that meet a criterion for the addition of the indirect path. For example, the report can be sent via a UEAssistanceInformation message or a SidelinkUEInformation message. In an embodiment, the remote UE 121 can receive a second RRC message to configure the indirect path.

Figure 7:
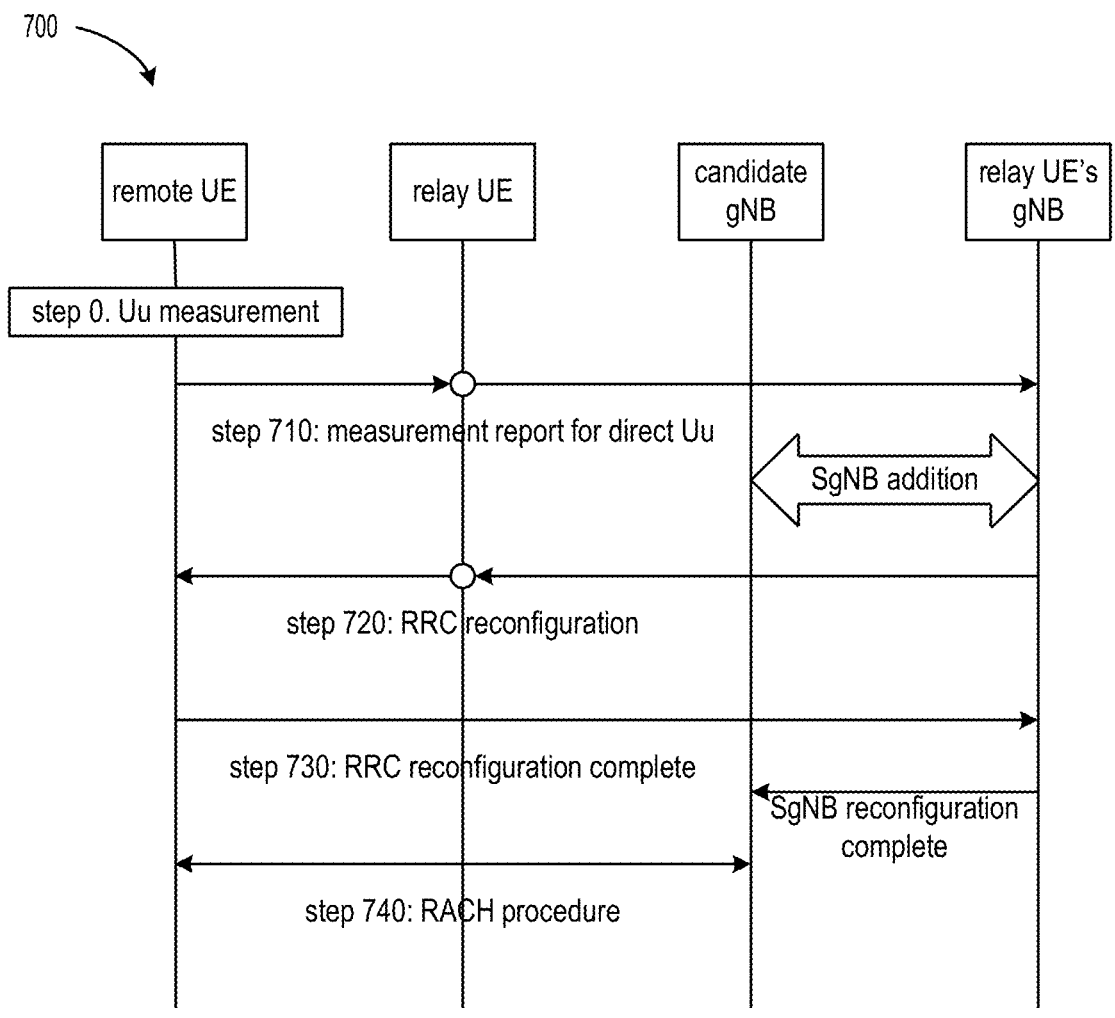
FIG. 7 shows an exemplary signaling procedure for a remote UE that already has an indirect path established to add a second path, e.g., a direct path, according to some embodiments of the present disclosure.

FIG. 7 shows an exemplary signaling procedure 700 for a remote UE that already has an indirect path established to add a second path, e.g., a direct path, according to some embodiments of the present disclosure. In an embodiment, the candidate gNB for the remote UE in the direct path is different from the gNB of a selected relay UE in the established indirect path, as shown in FIG. 2. The signaling procedure 700 can reuse the procedure for NR DC secondary cell group (SCG) addition (e.g., DC signaling for SCG addition), and only difference is that the remote UE 221 and its master cell group (MCG) gNB 211 can communicate with each other via an SL relay.

Figure 8:
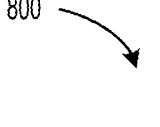
FIG. 8 shows an exemplary signaling procedure for a remote UE that already has a direct path established to add a second path, e.g., an indirect path, according to some embodiments of the present disclosure.
Figure 8:
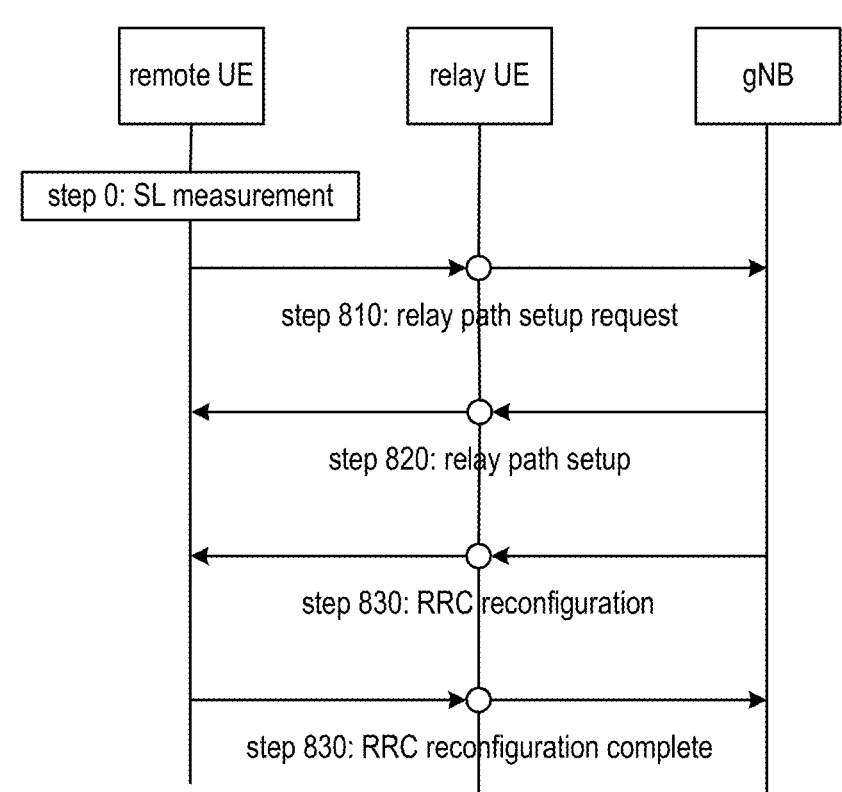

FIG. 8 shows an exemplary signaling procedure 800 for a remote UE that already has a direct path established to add a second path, e.g., an indirect path, according to some embodiments of the present disclosure. In an embodiment, the candidate cell for the remote UE in the indirect path is the same as the serving cell of the remote UE in the established direct path, as shown in FIG. 1. In an embodiment, the signaling procedure 800 is initiated by the remote UE 121. For example, the remote UE 121 can initiate a second path addition procedure by sending a request message. In an embodiment, when the remote UE 121 is configured with multi-path enabled and considers the candidate relay qualified (as configured by the network), the remote UE 121 can transmit a request message for second path addition via relay forwarding to the gNB 111, in step 810. In an embodiment, the request message may extend an existing RRCSetupRequest message or create a new RRC message to indicate the request for the addition of a second path. In another embodiment, the request message may contain one or a list of suitable relay UEs that meet one or more access stratum (AS) criteria. For example, the AS criteria may apply the legacy criteria for R17 SL relay (e.g., an SL RSRP threshold), a serving cell identity of the suitable relay UE(s), or other criteria related to relay UE capability or relay Uu link condition. As a response, the gNB 111 may reply with a message (e.g., agree or reject), in step 820. In an embodiment, the response message may extend the existing RRCSetup/RRCReject message or apply a new RRC message. In another embodiment, if a list of multiple relay UEs is provided to the network, the network can select one of them for the remote UE 121.

Figure 9:
FIG. 9 shows an exemplary signaling procedure for a remote UE that already has a direct path established to add a second path, e.g., an indirect path, according to some embodiments of the present disclosure.
Figure 9:
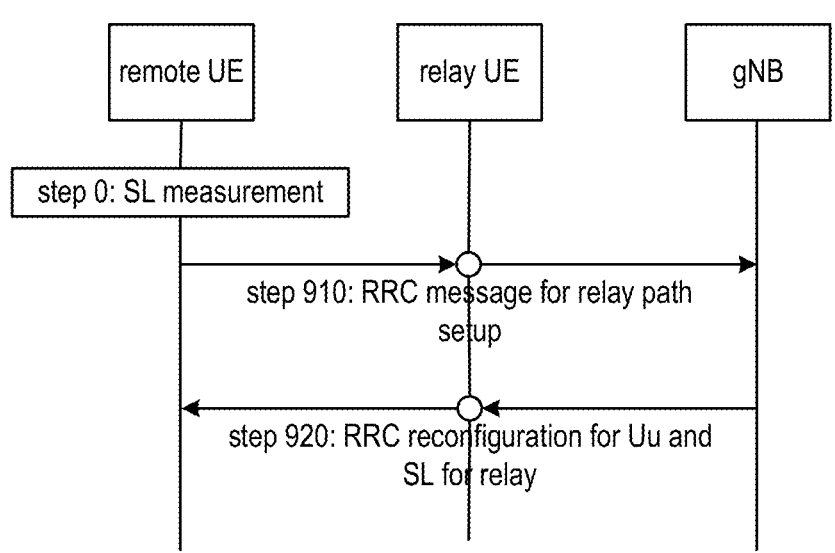

FIG. 9 shows an exemplary signaling procedure 900 for a remote UE that already has a direct path established to add a second path, e.g., an indirect path, according to some embodiments of the present disclosure. In an embodiment, the candidate cell for the remote UE in the indirect path is the same as the serving cell of the remote UE in the established direct path, as shown in FIG. 1. In an embodiment, the remote UE 121 in the signaling procedure 900 can add the indirect path autonomously by sending an RRC message as a notification to the gNB 111 through a relay, in step 910. When receiving the RRC message, the gNB 111 knows that the remote UE 121 wants to apply the reply to build the second path. The gNB 111 can then reconfigure per-hop UL/SL RLC channels and one or more end-to-end bearers for the indirect path, in step 920.

Figure 10:
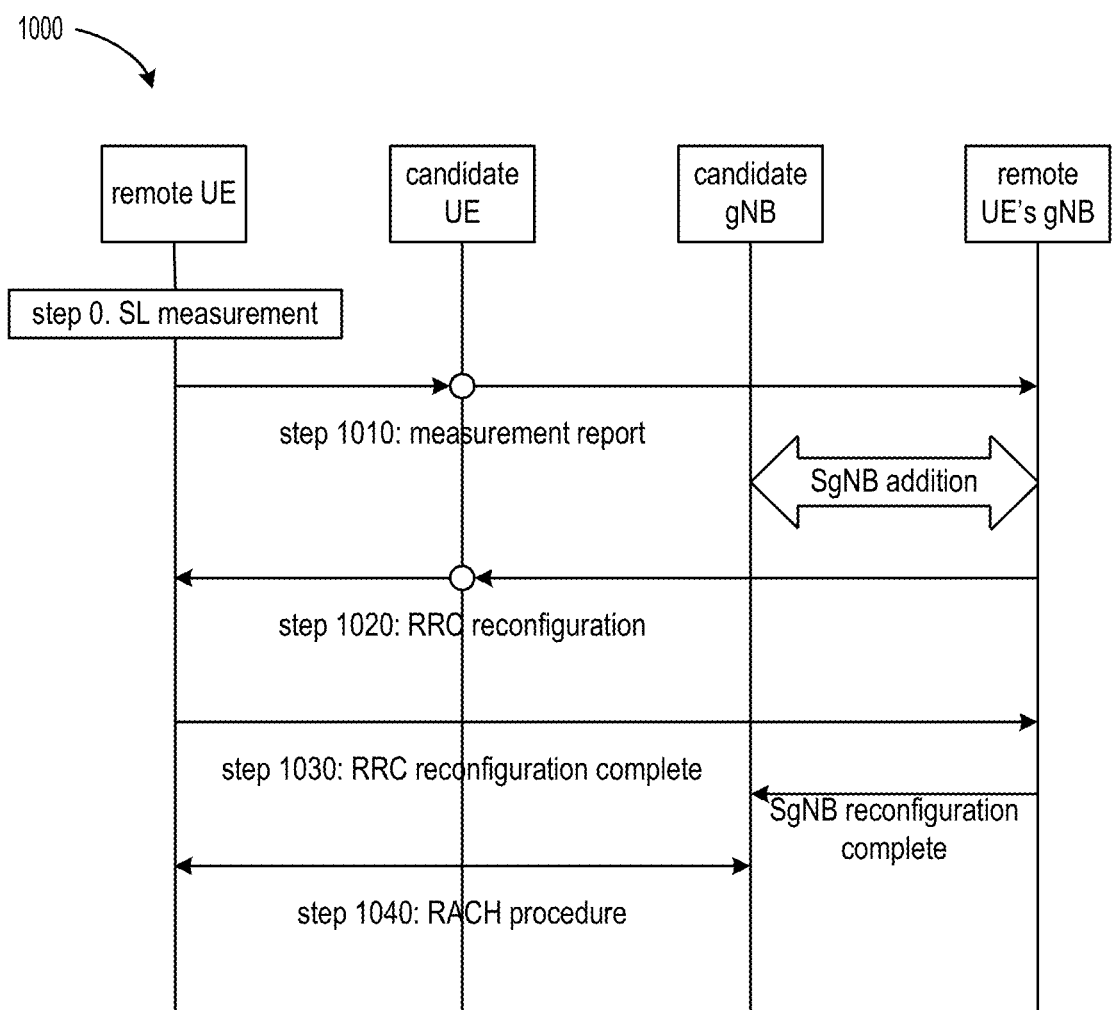
FIG. 10 shows an exemplary signaling procedure for a remote UE that already has a direct path established to add a second path, e.g., an indirect path, according to some embodiments of the present disclosure.

FIG. 10 shows an exemplary signaling procedure 1000 for a remote UE that already has a direct path established to add a second path, e.g., an indirect path, according to some embodiments of the present disclosure. In an embodiment, the serving gNB for a candidate relay UE in the indirect path is different from the gNB of the remote UE in the established direct path, as shown in FIG. 2. The signaling procedure 1000 can reuse the procedure for NR DC SCG addition (e.g., DC signaling for SCG addition).

In an embodiment, a relay UE and a remote UE may select different serving cells. In another embodiment, the serving cell/gNB/TRP may only support multi-path configuration wherein the remote UE and the relay UE may be linked to the same gNB or serving cell.

In an embodiment, if a remote UE already has a direct path and its PCell does not support inter-gNB multi-path, the remote UE can exclude those candidate relay UEs that are connected to a different gNB.

In an embodiment, if a remote UE already has an indirect path and the PCell of the relay UE does not support inter-gNB multi-path, the remote UE does not consider NR cells different from that of the relay UE as candidate cells.

In an embodiment, a remote UE may need to change its relay UE if the relay UE changes its serving cell when the PCell of the remote UE does not support inter-gNB multi-path. For example, if the relay UE performs handover and thus links to a different gNB from the remote UE, the remote UE may need to change its serving cell (e.g., handover to keep the indirect path) or change its relay (e.g., drop the indirect path and perform relay reselection, searching for a candidate relay linked to the same gNB as the remote UE).

Multi-Path: Remove the Second Path

For inter-gNB multi-path, e.g., one path being on MCG and the other path on SCG, the existing 3GPP R17 mechanism can be applied to release the indirect path, since the two paths belong to different RRC connections and can be handled separately.

For intra-gNB multi-path, two paths share the same RRC connection. The UE can then use the existing (first) path to report the status of the second (to be removed) path, if needed.

In an embodiment, the indirect path or the selected relay UE of the remote UE may become unavailable (e.g., SL radio link failure occurs, SL-RSRP is below a threshold, upper layers indicate not to use the currently selected relay, upper layers request the release of the PC5-RRC connection, or AS layer releases the PC5-RRC connection with the currently selected U2N Relay UE). In this case, the remote UE may report via a Uu link (direct path) to the gNB. For example, a SidelinkUEInformation message may be used to carry information when the SL (indirect path) is not available. The remote UE can report the reason/cause to release the indirect path. After receiving the notification, the gNB would reconfigure the remote UE, e.g., releasing SL configuration for the indirect path towards the unused relay, and the procedures for PDCP reestablishment or PDCP recovery may be triggered. Un-received PDCP packets may be retransmitted for both UL and DL directions via the direct path. A remote UE configured with the multi-path feature, after an indirect path is torn down, need not perform RRC reestablishment procedure (since the direct link still works normally), but can trigger a relay (re)selection procedure to search for a suitable relay UE for second path addition.

In an embodiment, the gNB can trigger the UE to release a path. For example, in case the UE has infrequent traffic to transmit, the gNB may want the UE to maintain a single indirect path to save power. To trigger the second path removal, the gNB can send an RRC message to the remote UE (via either direct or indirect path) to indicate which path is to be removed and instruct the remote UE to reconfigure/release the corresponding AS configuration. For example, to release an indirect path, the remote UE may be configured to release the SL RLC configuration towards the indirect path. For example, to release a direct path, the remote UE may be instructed to flush all physical uplink control channel (PUCCH)/sounding reference signal (SRS) configuration for the released serving cell and reset the Uu MAC entity. If the two (direct and indirect) paths are considered as different RRC connections, an RRC release message can be reused. Otherwise, the network may extend an existing RRC message (e.g., RRC release or RRC reconfiguration) to remove a path without changing an RRC state of the UE or triggering RRC reestablishment procedure.

New Measurement Events for Multi-Path

In 3GPP R17 SL relay, there are several measurement events defined for a UE to trigger an event-based measurement report. In particular, measurement events X1, X2, Y1 and Y2 are specified for R17 SL relay. Measurement event X1 happens when a serving L2 U2N relay UE becomes worse than a first threshold and an NR cell becomes better than a second threshold. Measurement event X2 happens when a serving L2 U2N relay UE becomes worse than a threshold. Measurement event Y1 happens when a PCell becomes worse than a first threshold and a candidate L2 U2N relay UE becomes better than a second threshold. Measurement event Y2 happens when a candidate L2 U2N relay UE becomes better than a threshold.

To support the multi-path configuration, several new measurement events can be specified, so that the network can have knowledge about cell/relay link quality, which can be used to determine whether to add or remove the second path.

In an embodiment, new measurement events M1, M2, M3 and M4 for multi-path configuration have similar definitions to the measurement events X1, X2, Y1 and Y2, respectively, and the thresholds could be in units of dB for RSRQ or SINR, or in units of dBm for RSRP, for example.

In an embodiment, the measurement event M1 to trigger the sending of a measurement report for multi-path happens when a serving L2 U2N relay UE becomes better than a first threshold and an NR cell becomes better than a second threshold, as disclosed in the signaling procedure 500. The measurement event M1 intends to inform a network of the availability to add the second path (a direct path).

In an embodiment, the measurement event M2 to trigger the sending of a measurement report for multi-path happens when a PCell becomes better than a first threshold and a candidate L2 U2N relay UE becomes better than a second threshold, as disclosed in the signaling procedure 600. The measurement event M2 intends to inform a network of the availability to add the second path (an indirect path).

In an embodiment, the measurement event M3 to trigger the sending of a measurement report for multi-path happens when a serving L2 U2N relay UE becomes better than a first threshold and a PCell becomes worse than a second threshold. The measurement event M3 intends to inform a network of the availability to remove the second path (a direct path). For example, as shown in FIG. 1, when the measurement event M3 happens, the remote UE 121 can send to the gNB 111 a measurement report that is dedicated for multi-path, allowing the gNB 111 to decide whether to remove the direct path, and the gNB 111 can then send an RRC reconfiguration message to the remote UE 121 to trigger the removal of the direct path.

In an embodiment, the measurement event M4 to trigger the sending of a measurement report for multi-path happens when a serving L2 U2N relay UE becomes worse than a first threshold and a PCell becomes better than a second threshold. The measurement event M4 intends to inform a network of the availability to remove the second path (an indirect path). For example, as shown in FIG. 1, when the measurement event M4 happens, the remote UE 121 can send to the gNB 111 a measurement report that is dedicated for multi-path, allowing the gNB 111 to decide whether to remove the indirect path, and the gNB 111 can then send an RRC reconfiguration message to the remote UE 121 to trigger the removal of the indirect path.

In an embodiment, a remote UE configured with multi-path is not requested to measure for potential candidate serving cells or candidate relay UEs if the remote UE is already configured with the maximum number of configurable paths and all configured paths work well, e.g., a measured quantity of each configured path is better than a threshold.

Figure 11:
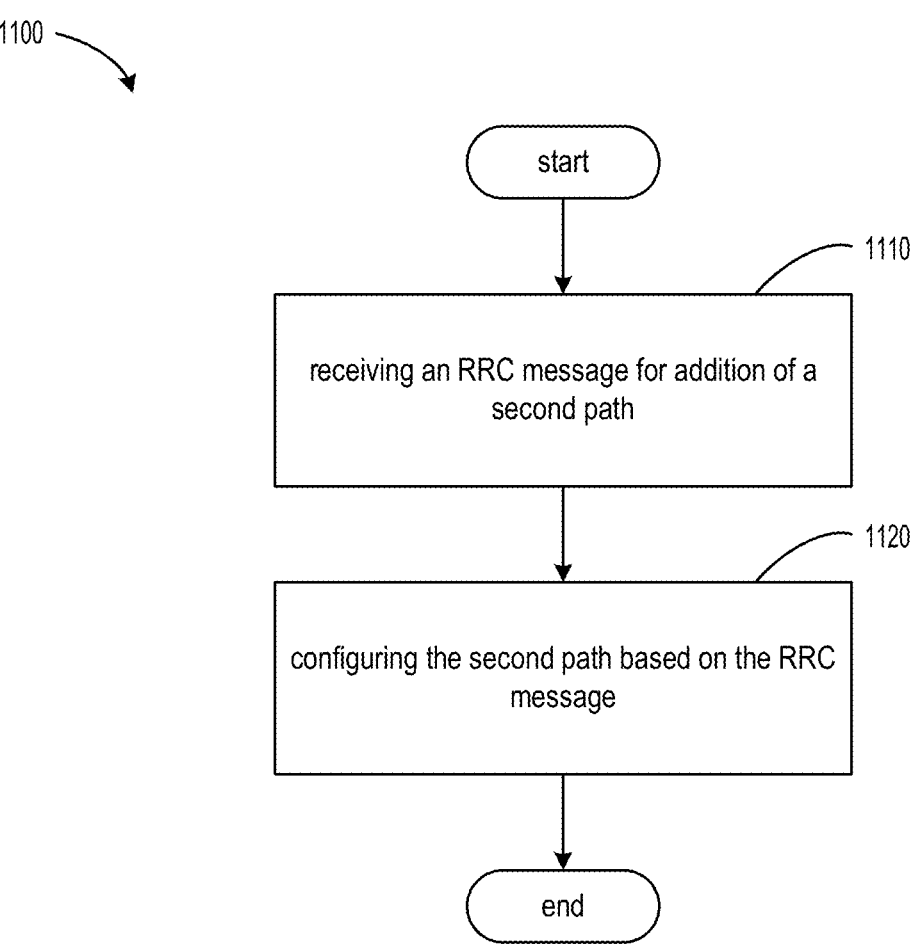
FIG. 11 is a flow chart of an exemplary method for a remote UE that has a first path to a network and a second path to the network to remove the second path according to some embodiments of the present disclosure.

FIG. 11 is a flow chart of an exemplary method 1100 for a remote UE that has a first path to a network and a second path to the network according to some embodiments of the present disclosure. The method 1100 relates to removal of the second path by determining the measurement events M3 and M4. In various embodiments, some of the steps of the method 1100 shown can be performed concurrently or in a different order than shown, can be substituted by other method steps, or can be omitted. Additional method steps can also be performed as desired. Aspects of the method 1100 can be implemented by a wireless device, such as the remote UE 121 illustrated in and described with respect to the preceding figures. In an embodiment, the remote UE 121 has a first path and a second path to a network, e.g., the gNB 111, and the method 1100 can remove the second path for the remote UE 121 from the gNB 111. The method 1100 can include steps 1110 and 1120.

In step 1110, the remote UE 121 receives an RRC message from the network for removal of the second path. In step 1120, the remote UE 121 configures the second path based on the RRC message.

In an embodiment, the first path can be an indirect path of the remote UE 121 via a relay UE, e.g., the relay UE 131, to the network, the second path can be a direct path of the remote UE 121 to the network, and the remote UE 121 and the relay UE 131 can have serving cells belonging to the network. In an embodiment, the remote UE 121 can send a measurement report to the network when a measurement event happens. For example, the measurement event can happen when the serving cell of the relay UE 131 is better than a first threshold and the serving cell of the remote UE 121 becomes worse than a second threshold.

In an embodiment, the first path can be a direct path of the remote UE 121 to the network, the second path can be an indirect path of the remote UE 121 via the relay UE 131 to the network, and the remote UE 121 and the relay UE 131 can have serving cells belonging to the network. In an embodiment, the remote UE 121 can send a measurement report to the network when a measurement event happens. For example, the measurement event can happen when the serving cell of the relay UE 131 is better than a first threshold and the serving cell of the remote UE 121 becomes worse than a second threshold.

Figure 12:
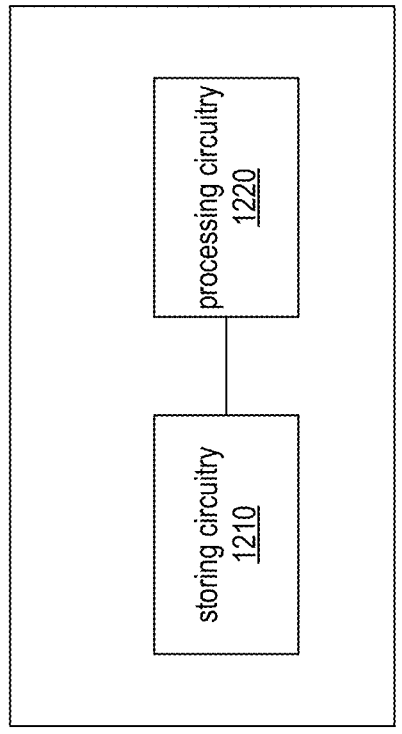
FIG. 12 is a functional block diagram of an apparatus that includes circuitry configured to perform a method for the apparatus, which already has a first path, to add a second path and remove the second path according to some embodiments of the present disclosure.
Figure 12:

FIG. 12 is a functional block diagram of an apparatus 1200, e.g., a UE. For example, the apparatus 1200 can include circuitry, e.g., storing circuitry 1210 and processing circuitry 1220, that is configured to perform a method, e.g., the methods 600A and 1100. In an embodiment, the apparatus can have a first path to a network, and the method is to add for the apparatus a second path to the network and can include receiving a first RRC message from the network for addition of the second path and configuring the second path based on the first RRC message.

In an embodiment, the first path is an indirect path of the apparatus via another apparatus to the network, the second path is a direct path of the first apparatus to the network, and the apparatus and the another apparatus have serving cells belonging to the network.

In an embodiment, the method can further include sending a measurement report to the network when a measurement event happens. For example, the measurement event can happen when the serving cell of the another apparatus is better than a first threshold and the serving cell of the apparatus becomes better than a second threshold. In an embodiment, configuring the second path based on the first RRC message can include: performing a cell (re-)selection procedure to evaluate a candidate serving cell for the addition of the direct path; and setting the candidate serving cell as a primary cell (PCell) of the apparatus. In another embodiment, configuring the second path based on the first RRC message can include performing a secondary cell (SCell) addition procedure to add the serving cell of the apparatus as the direct path for the apparatus.

In an embodiment, the first path can be a direct path of the apparatus to the network, the second path can be an indirect path of the apparatus via another apparatus to the network, and the apparatus and the another apparatus can have serving cells belonging to the network. In an embodiment, the method can further include sending a measurement report to the network when a measurement event happens. For example, the measurement event can happen when the serving cell of the apparatus is better than a first threshold and the serving cell of the another apparatus becomes better than a second threshold. In an embodiment, configuring the second path based on the first RRC message can include: performing a relay selection procedure to evaluate a candidate relay UE for the addition of the indirect path; and setting the candidate relay UE as the another apparatus in the indirect path of the apparatus. In another embodiment, configuring the second path based on the first RRC message can include performing a cell addition procedure to add the serving cell of the another apparatus as the indirect path for the apparatus.

In an embodiment, performing the cell addition procedure can include sending a report to the network when a list of candidate relay UEs is updated that meet a criterion for the addition of the indirect path. For example, the report can be sent via a UEAssistanceInformation message or a SidelinkUEInformation message. In an embodiment, the method can further include receiving a second RRC message to configure the indirect path.

In an embodiment, the method can further include receiving an RRC message from the network for removal of the second path and removing the second path based on the RRC message. In an embodiment, the first path is an indirect path of the apparatus via another apparatus to the network, the second path is a direct path of the apparatus to the network, and the apparatus and the another have serving cells belonging to the network. In an embodiment, the method can further include sending a measurement report to the network when a measurement event happens. In an embodiment, the measurement event happens when the serving cell of the another apparatus is better than a first threshold and the serving cell of the apparatus becomes worse than a second threshold. In an embodiment, the first path is a direct path of the apparatus to the network, the second path is an indirect path of the apparatus via another apparatus to the network, and the apparatus and the another apparatus have serving cells belonging to the network. In an embodiment, the method can further include sending a measurement report to the network when a measurement event happens, wherein the measurement event happens when the serving cell of the another apparatus is better than a first threshold and the serving cell of the apparatus becomes worse than a second threshold.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for a first user equipment (UE) that has a first path to a network to add a second path to the network, comprising:

receiving, at the first UE, a first radio resource control (RRC) message from the network for addition of the second path; and configuring, by the first UE, the second path based on the first RRC message;

wherein the first path is an indirect path of the first UE via a second UE to the network, the second path is a direct path of the first UE to the network, and the first UE and the second UE have serving cells belonging to the network, wherein configuring, by the first UE, the second path based on the first RRC message includes performing a secondary cell (SCell) addition procedure to add the serving cell of the first UE as the direct path for the first UE;

wherein the first path is a direct path of the first UE to the network, the second path is an indirect path of the first UE via a second UE to the network, and the first UE and the second UE have serving cells belonging to the network, wherein configuring, by the first UE, the second path based on the first RRC message includes performing a cell addition procedure to add the serving cell of the second UE as the indirect path for the first UE.

2. The method of claim 1, further comprising:

sending, by the first UE, a measurement report to the network when a measurement event happens.

3. The method of claim 2, wherein the measurement event happens when a reference signal received power (RSRP) of the serving cell of the second UE is greater than a first threshold and an RSRP of the serving cell of the first UE becomes greater than a second threshold.

4. The method of claim 1, wherein configuring, by the first UE, the second path based on the first RRC message includes:

performing a cell (re-) selection procedure to evaluate a candidate serving cell for the addition of the direct path; and setting the candidate serving cell as a primary cell (PCell) of the first UE.

5. The method of claim 1, further comprising:

sending, by the first UE, a measurement report to the network when a measurement event happens.

6. The method of claim 5, wherein the measurement event happens when a reference signal received power (RSRP) of the serving cell of the first UE is greater than a first threshold and an RSRP of the serving cell of the second UE becomes greater than a second threshold.

7. The method of claim 1, wherein configuring, by the first UE, the second path based on the first RRC message includes:

performing a relay selection procedure to evaluate a candidate relay UE for the addition of the indirect path; and setting the candidate relay UE as the second UE in the indirect path of the first UE.

8. The method of claim 1, wherein performing the cell addition procedure includes sending, by the first UE, a report to the network when a list of candidate relay UEs is updated that meet a criterion for the addition of the indirect path.

9. The method of claim 8, wherein the report is sent via a UEAssistanceInformation message or a SidelinkUEInformation message.

10. The method of claim 9, further comprising:

receiving a second RRC message to configure the indirect path.

11. A method for a remote user equipment (UE) that has a first path to a network and a second path to the network, comprising:

receiving, at the first UE, a radio resource control (RRC) message from the network for removal of the second path; and removing, by the first UE, the second path based on the RRC message;

wherein the first path is an indirect path of the first UE via a second UE to the network, the second path is a direct path of the first UE to the network, and the first UE and the second UE have serving cells belonging to the network, wherein the first UE performs a secondary cell (SCell) addition procedure to add the serving cell of the first UE as the direct path for the first UE;

wherein the first path is a direct path of the first UE to the network, the second path is an indirect path of the first UE via a second UE to the network, and the first UE and the second UE have serving cells belonging to the network, wherein the first UE performs a cell addition procedure to add the serving cell of the second UE as the indirect path for the first UE.

12. The method of claim 11, further comprising:

sending, by the first UE, a measurement report to the network when a measurement event happens.

13. The method of claim 12, wherein the measurement event happens when a reference signal received power (RSRP) of the serving cell of the second UE is greater than a first threshold and an RSRP of the serving cell of the first UE becomes lower than a second threshold.

14. The method of claim 11, further comprising:

sending, by the first UE, a measurement report to the network when a measurement event happens, wherein the measurement event happens when a reference signal received power (RSRP) of the serving cell of the second UE is greater than a first threshold and an RSRP of the serving cell of the first UE becomes lower than a second threshold.

15. An apparatus, comprising circuitry configured to perform a method for the apparatus, which has a first path to a network, to add a second path to the network and remove the second path from the network, the method including:

receiving a first radio resource control (RRC) message from the network for addition of the second path; and configuring the second path based on the first RRC message;

wherein the first path is an indirect path of the first UE via a second UE to the network, the second path is a direct path of the first UE to the network, and the first UE and the second UE have serving cells belonging to the network, wherein configuring the second path based on the first RRC message includes performing a secondary cell (SCell) addition procedure to add the serving cell of the first UE as the direct path for the first UE;

wherein the first path is a direct path of the first UE to the network, the second path is an indirect path of the first UE via a second UE to the network, and the first UE and the second UE have serving cells belonging to the network, wherein configuring the second path based on the first RRC message includes performing a cell addition procedure to add the serving cell of the second UE as the indirect path for the first UE.

16. The apparatus of claim 15, wherein the method further includes;

receiving a second RRC message from the network for removal of the second path; and removing the second path based on the second RRC message.

\* \* \* \* \*